United States Patent
Lyons (10) Patent No.: US 12,018,349 B2
(45) Date of Patent: Jun. 25, 2024

(54) METHODS AND SYSTEMS FOR LEACHING A METAL-BEARING MATERIAL

(71) Applicant: FREEPORT MINERALS CORPORATION, Phoenix, AZ (US)

(72) Inventor: Sarah Lyons, Vail, AZ (US)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 0 days.

(21) Appl. No.: 17/945,451

(22) Filed: Sep. 15, 2022

(65) Prior Publication Data
US 2023/0090475 A1 Mar. 23, 2023

Related U.S. Application Data

(60) Provisional application No. 63/246,046, filed on Sep. 20, 2021.

(51) Int. Cl.
C22B 3/16 (2006.01)
C22B 1/16 (2006.01)
(Continued)

(52) U.S. Cl.
CPC .............. *C22B 3/165* (2013.01); *C22B 1/16* (2013.01); *C22B 3/22* (2013.01); *C22B 15/0008* (2013.01);
(Continued)

(58) Field of Classification Search
CPC .. C22B 3/165; C22B 1/16; C22B 3/22; C22B 15/0008; C22B 15/0067; C22B 15/0086; C22B 15/0071; Y02P 10/20
(Continued)

(56) References Cited

U.S. PATENT DOCUMENTS 4,093,526 A 6/1978 Blanco et al.
6,395,061 B1 * 5/2002 Duyvesteyn .............. C22B 3/18
75/712
(Continued)

FOREIGN PATENT DOCUMENTS

CA 1156049 11/1983
CA 1156049 A * 11/1983
(Continued)

OTHER PUBLICATIONS

CN-101871049-A translation (Year: 2010).*
(Continued)

*Primary Examiner* — Brian D Walck
*Assistant Examiner* — Danielle Carda
(74) *Attorney, Agent, or Firm* — SNELL & WILMER L.L.P.

(57) ABSTRACT

Methods for recovering a metal value from a metal-bearing material are provided. The method comprises agglomerating the metal-bearing material with an agglomeration solution comprising a raffinate, an oxidant, and citric acid or salts thereof to form an agglomerated metal-bearing material; leaching the agglomerated metal-bearing material with a leaching solution comprising the raffinate and the citric acid or salts thereof to produce a pregnant leaching solution and a leached material; re-oxidizing the leached material with a curing solution comprising the raffinate and the oxidant; and recovering the metal value from the pregnant leach solution to produce the raffinate.

20 Claims, 3 Drawing Sheets

(51) Int. Cl.
*C22B 3/22* (2006.01)
*C22B 15/00* (2006.01)

(52) U.S. Cl.
CPC ...... *C22B 15/0067* (2013.01); *C22B 15/0086* (2013.01)

(58) Field of Classification Search
USPC .......................................................... 75/743
See application file for complete search history.

(56) References Cited

U.S. PATENT DOCUMENTS

| | | | |
|---|---|---|---|
| 8,388,729 | B2 | 3/2013 | Welham et al. |
| 10,344,353 | B2 | 7/2019 | Mujicic et al. |
| 2020/0224290 | A1 | 7/2020 | Oraby et al. |

FOREIGN PATENT DOCUMENTS

| | | | |
|---|---|---|---|
| CN | 101871049 | | 10/2010 |
| CN | 101871049 A | * | 10/2010 |
| CN | 111996373 | | 11/2020 |
| WO | WO9808585 | | 3/1998 |

OTHER PUBLICATIONS

Haas and Hebble, Influence of Chelating Reagents on Leaching of Copper Ore, col. 8965. US Department of the Interior, Bureau of Mines 1985 (Year: 1985).*

Salas-Martell et al., Leaching of a pyrite-based ore containing copper using sulfuric acid and hydrogen peroxide, International Journal of Industrial Chemistry, 11: 195-291, Jun. 2020 (Year: 2020).*

Stuurman, S., S. Ndlovu, and V. Sibanda. "Comparing the extent of the dissolution of copper-cobalt ores from the DRC Region." Journal of the Southern African Institute of Mining and Metallurgy 114.4 (2014): 347-349.

Jadhav, Umesh, C. Su, and Hong Hocheng. "Leaching of metals from large pieces of printed circuit boards using citric acid and hydrogen peroxide." Environmental Science and Pollution Research 23.23 (2016): 24384-24392.

Kokes, H., M. H. Morcali, and E. Acma. "Dissolution of copper and iron from malachite ore and precipitation of copper sulfate pentahydrate by chemical process." Engineering Science and Technology, an International Journal 17.1 (2014): 39-44.

Biswas, S., and A. F. Mulaba-Bafubiandi. "Extraction of Copper and Cobalt from Oxidized Ore using Organic Acids." Hydrometallurgy Conference. 2016.

Yazici, Ersin Yener. "Improvement of stability of hydrogen peroxide using ethylene glycol." Journal of Science and Engineering 19.57 (2017).

Mahajan, V., et al. "Enhanced leaching of copper from chalcopyrite in hydrogen peroxide-glycol system." Minerals Engineering 20.7 (2007): 670-674.

Gargul, K., et al. "Leaching of lead and copper from flash smelting slag by citric acid." Archives of Civil and Mechanical Engineering 19 (2019): 648-656.

Shabani, M. A., M. Irannajad, and A. R. Azadmehr. "Investigation on leaching of malachite by citric acid." International Journal of Minerals, Metallurgy, and Materials 19.9 (2012): 782-786.

Haas, Larry A., and Terry L. Hebble. "Influence of Chelating Reagents on Leaching of Copper Ore" vol. 8965. US Department of the Interior, Bureau of Mines, 1985.

PCT Notification of Transmittal of the International Search Report and the Written Opinion of the International Searching Authority, or the Declaration from PCT/US2022/043625 dated Jan. 6, 2023.

* cited by examiner

METHODS AND SYSTEMS FOR LEACHING A METAL-BEARING MATERIAL

CROSS-REFERENCE TO RELATED APPLICATIONS

This application claims priority to, and the benefit of, U.S. Provisional Patent Application Ser. No. 63/246,046 filed Sep. 20, 2021, entitled "Methods and Systems for Leaching a Metal-Bearing Material Using Hydrogen Peroxide and Citric Acid," the disclosure of which is incorporated herein by reference in its entirety for all proposes.

FIELD OF INVENTION

The present disclosure generally relates to recovering metal values from metal-bearing materials, and specifically to leaching methods and systems comprising acids, oxidants, and citric acid or citrates.

BACKGROUND

Advances in leaching technology have made it possible to recover copper values from secondary copper sulfides, such as for example, chalcopyrite, chalcocite and covellite. To break copper-iron-sulfur bonds in these and other minerals, oxidative conditions can be used. Although sulfuric acid, typically present in leaching, carries some oxidizing potential, much of the driving force for leaching sulfides comes from the oxidation potential of ferric iron present in solution from iron bearing minerals such as pyrite. When ferric iron oxidizes copper sulfide minerals, the ferric iron is reduced to ferrous iron. The ferrous iron can be oxidized back to ferric iron to further oxidize copper sulfide minerals if an oxidant such as oxygen or another oxidant is present. For this re-oxidation to occur, a source of oxygen or another oxidant is used.

Although these leaching methods comprising acid and oxidant are relatively effective at metal extraction, implementing improvements to traditional processing techniques to increase extraction efficiency is economically advantageous. An improvement of leaching efficiency based on existing leaching methods may entail using reagents other than acids in the leaching solution. Various additives have been proposed for the purpose of improving the effectiveness of heap leaching operations, but many of these are costly or can create operational issues or, under certain conditions, pose risks to worker health and safety. For example, the addition of silver to leach systems had been found to improve extraction of copper from sulfide minerals such as chalcopyrite, but the additive is costly and prone to loss through precipitation. Another class of reagents that have been proposed require high pH systems that are not compatible with long established sulfuric acid-based chemistries.

Additionally, in many heap leaching operations, gangue materials consume acid. If insufficient acid is added, the pH of the leach solutions within a stockpile will rise. As pH rises, ferric iron begins to precipitate out of solution as a viscous and sticky mineral known as jarosite. Jarosite is detrimental for several reasons, but particularly because it coats various materials in the stockpile, which can inhibit beneficial reactions that would otherwise occur to benefit copper recovery.

Accordingly, there is an ongoing need for leaching methods and systems with improved occupational safety, cost, efficiency, and reduced environmental impact. There remains a particular need for leaching methods that mitigate ferric iron precipitation.

SUMMARY

In accordance with various embodiments of the present disclosure, it has now been surprisingly discovered that citric acid or a citrate salt thereof, in combination with an oxidant, acts as a stabilizing agent for iron ions, mitigating the formation of jarosite due in part to insufficient acid and rising pH in stockpiles. Unexpectedly, the ferric-citrate species formed plays a beneficial role in copper sulfide leaching.

In accordance with various aspects of the present disclosure, introducing an oxidant and citric acid or salt thereof to a leaching solution result in increased extraction efficiency with little adverse environmental effects.

In various embodiments, a heap leach operation is run at above-ambient temperatures. Such operations are more efficient and, when an oxidant is added in the agglomeration step of a traditional, sulfuric acid-based leach operation, the exothermic reaction naturally generates heat. This natural reaction provides a lower-cost alternative to traditional heat-addition methods which require external heat sources to raise heap temperature.

In various embodiments, a cyclic process for recovering metal values from metal-bearing materials is described. The method comprises leaching a metal-bearing material comprising a metal value with a leaching solution comprising a raffinate, sulfuric acid, an oxidant, and citric acid or salts thereof, to produce a leached material and a pregnant leach solution, the leached material comprising ferrous ($Fe^{2+}$) ions and ferric ($Fe^{3+}$) ions; curing the leached material with a curing solution comprising the raffinate and the oxidant to re-oxidize the ferrous ($Fe^{2+}$) ions to ferric ($Fe^{3+}$) ions and to produce a cured leached material; recycling the ferric ($Fe^{3+}$) ions to the leaching step; and recovering the metal value from the pregnant leach solution to produce the metal value and the raffinate; wherein the raffinate obtained after recovering the metal value is recycled to the leaching.

In various embodiments of a cyclic process, the ferric ($Fe'$) ions are recycled to the leaching in the recycled raffinate.

In various embodiments of a cyclic process, the curing solution further comprises the citric acid or salts thereof.

In various embodiments of a cyclic process, the oxidant comprises hydrogen peroxide.

In various embodiments of a cyclic process, the metal-bearing material comprises run-of-mine (ROM) material optionally augmented with the cured leach material obtained from the curing.

In various embodiments of a cyclic process, the cured leach material comprises the ferric ($Fe^{3+}$) ions recycled to the leaching to augment the ROM material.

In various embodiments of a cyclic process, the leaching and the subsequent curing are cyclically repeated prior to recovering the metal value from the pregnant leach solution.

In various embodiments of a cyclic process, the leaching comprises a heap leach operation, wherein a first line directed to the heap is configured to provide the oxidant to the heap, and a second line directed to the heap is configured to provide the sulfuric acid and the citric acid or salts thereof to the heap. In various embodiments of a two-line configuration, the oxidant comprises hydrogen peroxide.

In various embodiments of a cyclic process, an output from a sugar fermentation process configured to produce citric acid or salts thereof is directed into the second line directed to the heap to provide the citric acid or salts thereof in the leaching.

In various embodiments, a cyclic process further comprises a step of agglomerating metal-bearing material with an agglomerating solution prior to leaching, the agglomerating solution comprising the raffinate, the oxidant, the sulfuric acid, and the citric acid or salts thereof.

In various embodiments, agglomeration comprises combining the metal-bearing material, the raffinate, the oxidant, and the citric acid or salts thereof in an agglomeration drum.

In various embodiments of a cyclic process, the pregnant leach solution is repeatedly recycled back to the leaching step prior to recovering the metal value from the pregnant leach solution.

In various embodiments of a cyclic process, the metal-bearing material comprises a primary or secondary copper sulfide, or mixtures thereof.

In various embodiments of a cyclic process, the recovering of metal value from the pregnant leach solution comprises a solvent extraction/electrowinning (SX/EW) process or a direct electrowinning (DEW) process.

In various embodiments of a cyclic process, the leaching comprises a heap leach operation further comprising subsurface injection of the leaching solution into the heap.

In various embodiments of a cyclic process, the metal-bearing material comprises a mixture of copper-bearing ROM ore and the leached material.

In various embodiments of a cyclic process, the leaching further comprises injection of air and/or oxygen into the leaching solution.

In various embodiments of a cyclic process, the leaching comprises a heap leach operation further comprising subsurface injection of air and/or oxygen into the heap. In various embodiments, subsurface injection of air and/or oxygen into the heap comprises subsurface injection of leaching solution previously or continuously aerated with air and/or oxygen.

BRIEF DESCRIPTION OF THE DRAWINGS

The subject matter is pointed out with particularity and claimed distinctly in the concluding portion of the specification. A more complete understanding, however, may best be obtained by referring to the detailed description and claims when considered in connection with the following drawing figures.

DETAILED DESCRIPTION

The detailed description of exemplary embodiments makes reference to the accompanying drawings, which show exemplary embodiments by way of illustration and their best mode. While these exemplary embodiments are described in sufficient detail to enable those skilled in the art to practice the invention, it should be understood that other embodiments may be realized and that logical, chemical, and mechanical changes may be made without departing from the spirit and scope of the inventions. Thus, the detailed description is presented for purposes of illustration only and not of limitation. For example, unless otherwise noted, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

It has now been surprisingly found that a chelating agent, such as, for example, citric acid or salts thereof, can stabilize iron in solution and mitigate the formation of jarosite caused by iron precipitation in traditional sulfuric acid leaching processes, thereby increasing metal value recovery, and leaching efficiency. This iron stabilization effect has been found to be particularly beneficial when used in combination with an oxidant, such as, for example, hydrogen peroxide. Unexpectedly, the ferric-citrate species formed beneficially participates in leach reactions yielding higher copper recovery.

Definitions and Interpretations

As used herein, the term "citric acid and salts thereof" includes any amorphous or crystalline form of citric acid, including any hydrate and any mono-, di-, or tri-citrate salt, wherein the counterion of a citrate anion comprises any alkali metal, any alkaline earth metal, or any transition metal cation. Di- and tri-citrate salts of citric acid need not have a single species of cation, and thus citrate salts include di- and tri-salts with any combination of counter-cations. Non-limiting examples of citric acid and salts thereof include citric acid monohydrate, disodium citrate, trisodium citrate, ferric citrate (iron (III) citrate), and tricalcium citrate (commonly referred to as simply "calcium citrate"). Since metal leaching conditions in accordance with the present disclosure are typically acidic, it often does not matter what citrate salt is added to a leach heap since all citrate salts will be converted to citric acid in the acidic leaching conditions. Further, it is expected that ferric citrate (iron (III) citrate) will be present in a heap leaching system that includes pyrite, citric acid, or salts thereof, oxidant and acid.

As used herein, the acronym ROM refers to "run of mine," which is ore in its unprocessed state before agglomeration or leaching. ROM is not limited to mined rock, but also includes blasted or crushed material.

As used herein, the term "gangue materials" takes on its ordinary meaning in mineralogy, namely commercially valueless material in which ore is found, such as silicate, oxide, carbonate, and sulfate minerals that do not contain sufficient metal value.

As used herein, the term "raffinate" takes on its ordinary meaning in mining operations, namely, a liquid stream that is left after a metal value has been extracted. Raffinate is recycled in a leaching operation so as not to waste costly reagents still present after metal value recovery, such as sulfuric acid. In other words, acid can be added to a leach heap simply by recycling a raffinate flow to the heap. A portion of the acid present in raffinate results from the transfer of acid generated in copper electrowinning operations through solvent extraction operations to the raffinate. After copper is leached from a leach stockpile system, the aqueous fluid carrying the copper (called PLS or Pregnant Leach Solution) reports to solvent extraction operations which concentrate and purify the copper bearing aqueous stream by means of selectively exchanging copper ions from the PLS stream to an organic phase containing copper chelating agents. During this chemical exchange, H+ ions are transferred to the raffinate, thus lowering the pH of the solutions (increasing their free acid concentration). These H+ ions originate in electrowinning processes that operate in closed circuit with SX or Solvent Extraction plants. In copper electrowinning operations, copper is plated in an electrolytic reaction. The accompanying half-cell reaction breaks down water to produce oxygen gas and H+ ions. Spent solution from electrowinning operations is sent to Solvent Extraction plants, where the H+ ions are exchanged for copper ions from aqueous PLS streams. Once the copper has been removed from the aqueous PLS stream, it is now called raffinate and is recycled to leach operations. Optionally, PLS can be independently recycled to leaching, or when configured as a split stream, sent partially to metal extraction and partially returned to leaching.

As used herein, the term "metal value" refers to an elemental metal having at least some commercial/monetary value. In various embodiments, a metal value may comprise copper, nickel, zinc, silver, gold, germanium, lead, arsenic, antimony, chromium, molybdenum, rhenium, tungsten, iron, ruthenium, osmium, cobalt, rhodium, iridium, palladium, platinum, uranium, or rare earth metals.

As used herein, the term "metal-bearing material" refers to any substance comprising a metal value that can be removed at least to some degree by leaching. In various embodiments, a metal-bearing material comprises an ore, a concentrate, a process residue such as leached ore, or a blend of leached ore and newly mined ore, or various combinations thereof. In various embodiments, a metal-bearing material comprises a copper-bearing material. In various embodiments, a metal-bearing material comprises chalcocite, pyrite, chalcopyrite, arsenopyrite, bornite, covellite, digenite, cobaltite, enargite, galena, greenockite, millerite, molybdenite, orpiment, pentlandite, pyrrhotite, sphalerite, stibnite, and/or any other suitable metal-bearing ore material, and mixtures thereof. In various embodiments, a metal-bearing material comprises a primary or secondary sulfide such as chalcocite, bornite, pyrite, or chalcopyrite, or a blend thereof.

General Embodiments

In the detailed description, references to "various embodiments", "one embodiment", "an embodiment", "an example embodiment", etc., indicate that the embodiment described may include a particular feature, structure, or characteristic, but every embodiment may not necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In general, the present disclosure relates to methods and systems for recovering metal values from metal-bearing materials and, more specifically, to leaching methods and systems using an oxidant and citric acid or salts thereof. Various embodiments of the present invention provide a method for recovering metal values through agglomerating a metal-bearing material with an agglomeration solution, which contains a raffinate, an oxidant, and citric acid or salt thereof to produce an agglomerated metal-bearing material, leaching the agglomerated metal-bearing material with a leaching solution, which contains the raffinate and the citric acid or salt thereof, to produce a pregnant leaching solution and a leached material, re-oxidizing the leached material with a curing solution, which contains the raffinate, citric acid or salt thereof and the oxidant, and recovering the metal value from the pregnant leaching solution to produce the raffinate.

In various embodiments of the present disclosure, a method for recovering a metal value from a metal-bearing material is provided.

In various embodiments, a metal-bearing material comprises a copper sulfide ore and a corresponding metal value to be obtained from the ore comprises copper.

In various embodiments, leach solutions used herein comprise an acid, an oxidant, and citric acid or salts thereof.

In various embodiments, leach solutions used herein comprise sulfuric acid, hydrogen peroxide, and citric acid or a suitable citrate salt thereof.

In various embodiments, a method for recovering a metal value from a metal-bearing material includes agglomerating the metal-bearing material with an agglomeration solution comprising a raffinate, an oxidant, and citric acid or salt thereof to form an agglomerated metal-bearing material. The method further includes leaching the agglomerated metal-bearing material with a leaching solution comprising the raffinate and citric acid or salt thereof to produce a pregnant leaching solution and a leached material. The raffinate may also contain the oxidant.

In various embodiments, a method for recovering a metal value from a metal-bearing material also includes recovering the metal value from the pregnant leaching solution to produce the raffinate.

In various embodiments, processes herein are cyclic processes in that raffinate, obtained after recovery of the metal value from the PLS, is returned to the heap, to an agglomeration process, and/or to a curing process, to recycle reagents such as acid, oxidant, and citric acid or salts thereof.

In various embodiments, a method for recovering a metal value from a metal-bearing material includes re-oxidizing leached material with a curing solution, which contains raffinate, citric acid or salt thereof, and oxidant.

In various embodiments, leach conditions in accordance with the present disclosure promote re-oxidation of ferrous ions to ferric ions. Variables adjusted to promote re-oxidation include, but are not limited to, type of ore and associated amount of iron, whether the ore is ROM or is ground and/or agglomerated, temperature, atmospheric pressure, time, pH, type and concentration of acid, type and concentration of oxidant, the presence or absence of oxygen during leaching, concentration of citric acid or salt thereof, and leaching configuration, including heap configuration, location of airflow inlets, how the leach solution is added, and so forth.

In various embodiments, copper leaching occurs when chemical and physical driving forces are present, and in various examples, metal recovery is optimized as a function of re-oxidation of ferrous to ferric ions.

In various embodiments, a leach system may receive inputs reporting the extent various additives contribute to metal value recovery.

In various embodiments, ROM materials may be treated to a "trickle-down" cure wherein a curing solution comprising raffinate, an oxidant, and citric acid or salt thereof is added to the ore via traditional drip emitters for several days prior to leaching with a solution of raffinate enhanced with citric acid or salt thereof.

In various embodiments, metal-bearing ore may be sufficiently wetted such that lixiviants can contact the mineral surfaces. This wetting is completed by aqueous solutions which may contain a combination of water, reclaimed water, raffinate from solvent extraction plants, sulfuric acid, and intermediate leach solution (ILS). ILS may comprise mixtures of low grade PLS solutions which are recycled to leaching to satisfy water balances. ILS is often enriched with sulfuric acid. Oxides and simple carbonate minerals may be leached simply by contact with low pH solutions containing sulfuric acid. Copper may be leached in response to the solution pH being low enough directly at the mineral surface. However, competing acid consuming reactions from adjacent gangue minerals may drive pH up to the point where an insufficient or ineffective chemical driving force is present and copper leach recovery may suffer.

Sulfide minerals may be more complicated to leach and include the use of not only low pH, but elevated oxidation potential to leach. Achieving an elevated pH (ORP—oxidation reduction potential) may include the presence of an oxidant in solution. Traditionally, this consists of ferric iron ($Fe^{3+}$) generated by the aeration of solutions or the presence of native iron oxidizing bacteria (bioleaching).

In various embodiments, increased oxidative conditions are necessary, and a chemical oxidant may be added for this purpose. When iron is present in solution, the pH directly at the mineral surfaces should be below about 3. If pH is allowed to increase because of the presence of acid consuming minerals, iron may precipitate out of solution as a sticky jarosite that can coat and passivate mineral surfaces. Alternate oxidants include halide ions such as the chloride contained in brine or solid salt, chemical oxidants, air, or oxygen. In various embodiments, air or oxygen may be introduced by elevating dissolved oxygen in solution or by addition of stable microbubbles to leach solutions. Air and/or oxygen may also be injected into a leach heap, or air and/or oxygen may be injected into leach solutions to form microbubbles and the resulting mixtures injected subsurface or deep into a leach heap. In this latter method, leaching solution is aerated with air and/or oxygen, and the aerated leaching solution is injected subsurface or deep into the heap. These oxygenated processes are important in bacterial leaching operations.

When mineral surfaces passivate by formation of elemental or polysulfide layers, additives may be used to alleviate this passivation. For example, the presence of silver ions in solution may restrict the formation of passivating layers on a chalcopyrite mineral surface. Another class of additives (added as solid particles) enhances galvanic leach reactions and causes corrosion and dissolution at the copper mineral surfaces. Pyrite particles may set up such galvanic reactions. Additionally, the oxidation of pyrite may provide a heat source which increases the temperature of the leach stockpile. However, as pyrite oxidizes, iron is put into solution and if allowed to precipitate may cause decreased leach recovery, permeability concerns, or other operational issues.

In various embodiments, leaching methods herein comprise heap leaching. Heap leaching provides a low-cost method of extracting metal values from relatively low-grade metal-bearing materials and has found application in the processing of metal-bearing ores.

In various embodiments, an ore is mined, crushed, and then transported to a heap location where it is stacked onto a pad. In some operations, the crushed ore goes through a particle size enhancement process called agglomeration to improve leaching efficiency before it is transported to the heap. A suitable acidic solution is dispensed onto the heap, and the resulting leach solution trickles slowly through the heap under the force of gravity to the pad. This pad typically has a sloped base to allow the solution to flow into collection drains for further processing, such as by a conventional, solvent extraction/electrowinning (SX/EW) process or a direct electrowinning (DEW) process.

In various embodiments, ore is first subjected to the energy intensive processes of crushing and agglomeration, after which a high percentage of the contained valuable metal can be extracted by the leaching methods disclosed herein, using an acid solution containing iron. In general, in such methods, the iron ions are indirectly oxidized to the ferric state This oxidized ferric is then available to oxidize sulfide materials.

In various embodiments, agglomeration comprises placing a metal-bearing material in contact with an agglomeration solution for about 0 to about 30 days, for about 1 to about 10 days, or for a duration on the order of at least 2 days.

In various embodiments, an agglomeration solution comprises a concentration of an oxidant in the range of about less than about 10% by weight, about 1 to about 6% by weight, or on the order of about 4% to about 6% by weight.

In various embodiments, an agglomeration solution comprises citric acid or salt thereof at less than about 20 grams per liter, or between 2 grams and 10 grams per liter of agglomeration solution.

In various embodiments, leaching of a metal-bearing material comprises contacting an agglomerated metal-bearing material with a leaching solution for about 0 to about 50 days, for about 10 to about 45 days, or for a duration on the order of at least 15 days. In various embodiments, a leaching solution may comprise a concentration of citric acid or salt thereof on the order of less than about 20 g/l, preferably in the range of about 0.5 g/l to less than about 10 g/l, and more preferably on the order of about 3 g/l.

In various embodiments, re-oxidation of ferrous ions to ferric ions in solution comprises contacting a leached material with a curing solution for about 0 to about 30 days, for about 1 to about 10 days, or for a duration on the order of at least 2 days.

In various embodiments, re-oxidizing may comprise addition of the same amounts and types of reagents used in the original oxidizing cycle, or it may be adjusted based on prior recovery and the estimated amounts of economical minerals remaining to be leached.

In various embodiments, a cycle of leaching and subsequent re-oxidizing may be continued for as long as is practically or economically feasible, such as on the order of about a year.

In various embodiments, a method for recovering a metal value from a metal-bearing material may further comprise forming at least a portion of a heap with an agglomerated metal-bearing material after a step of agglomerating.

In various embodiments, leaching of a metal-bearing material may comprise leaching a heap with a leaching solution to obtain a PLS.

In various embodiments, metal recovery may comprise a solvent extraction and electrowinning (SX/EW) process, or a direct electrowinning (DEW) process to obtain the metal value from the PLS.

In various embodiments, old ore or remined ore may be combined with new ore for further processing.

In various embodiments, a method for recovering a metal value from a metal-bearing material comprises agglomerating the metal-bearing material with an agglomeration solution to form an agglomerated metal-bearing material, the agglomeration solution comprising a raffinate, an oxidant, and citric acid or a salt thereof.

In various embodiments, a method for recovering a metal value from a metal-bearing material further comprises forming at least a portion of a heap with the agglomerated metal-bearing material.

In various embodiments, a method for recovering a metal value from a metal-bearing material further comprises leaching the heap with a leaching solution comprising the raffinate and the citric acid or salt thereof to produce a PLS and a leached material.

In various embodiments, a method for recovering a metal value from a metal-bearing material further comprises re-oxidizing the leached material with a curing solution, which contains the raffinate, citric acid or salt thereof, and the oxidant.

In various embodiments, a method for recovering a metal value from a metal-bearing material further comprises recovering the metal value from the PLS to produce the raffinate and the metal value.

In various embodiments, a method for recovering a metal value from a metal-bearing material further comprises recycling the raffinate into the heap, into an agglomeration solution, into a curing solution, and/or into a leaching solution.

Types of Ore

In contrast to the secondary copper sulfides such as chalcocite and covellite, copper is more tightly bound to iron and sulfur within the mineral lattice of primary copper sulfide ores such as chalcopyrite. Although much work is currently being performed to leach chalcopyrite bearing minerals, generally leach recovery from these minerals is low (e.g., around 15% of the contained copper over hundreds of days of leaching). This usually results in these minerals being sent to froth flotation and smelting. However, some chalcopyrite may be placed on leach stockpiles, either because the chalcopyrite is mixed with other (more leachable) minerals or because the chalcopyrite is contained in ore whose copper grade was too low (below mill cutoff-grade) to be processed economically via the froth flotation and smelting route. The leach recovery from chalcopyrite minerals may be improved by using leach additives (of various chemical classes) to leach solutions or by adding the solutions directly to the ore. Oxygen or an oxidant of some type must also be present and available at the mineral surfaces to be leached.

Leaching Conditions

Temperature is a factor in the leaching of both secondary sulfides and primary sulfides. Temperature may increase metal recovery on the order of, for example, 0.5% for every 1° C. in temperature, provided sufficient oxygen is present for the oxidation reactions to proceed. Such increases in recovery may be impacted by several considerations, variable ranges, and practical limits. While temperature may be increased by heating surrounding or applied air or leach solutions, the temperature may also increase due to the balance of exothermic chemical reactions and/or endothermic chemical reactions occurring within the leach stockpile (e.g., the oxidation of pyrite). Because temperature is such an important driving factor for primary sulfide leaching, it is advantageous to increase the percentage of pyrite placed on leach stockpiles to the extent that oxygen or an oxidant is available to oxidize the pyrite and acid is available to keep the pH of the leach solutions low enough to prevent the formation of gelatinous iron hydroxide gels such as iron jarosite. The formation of such iron hydroxide gels is considered detrimental to heap leaching for a variety of reasons. Firstly, such precipitation decreases the permeability of the leach stockpiles so that contact between ore and leach solutions is diminished. Secondly, such precipitation can blind off mineral surfaces and hinder or prevent further leaching. Thirdly, ferric iron is an important oxidant in the leaching of primary sulfides, and when precipitated, it is no longer available to take part in any chemical reactions. Therefore, there is both a cost and a benefit to having increased amounts of pyrite present in leach stockpiles. While leach recoveries may benefit from increased temperatures, costs may be incurred due to the additional oxygen required to oxidize the pyrite. Further, costs are incurred for the additional acid required to keep ferric iron in solution. This acid cost depends partially on the amounts and types of gangue minerals present in the ore. In accordance with the present disclosure, citric acid or a citrate salt thereof, is used to stabilize ferric iron in solution while strongly oxidizing conditions are applied to an ore to enhance leach recovery. Unexpectedly, the ferric citrate species created by the addition of citric acid aids in copper recovery from refractory copper minerals.

Leaching Configurations

In various embodiments, methods for recovering metal values from a metal-bearing material comprises any one or combination of heap leaching, subsurface leaching, deep leaching, column leaching, shake flask leaching, or tank leaching. In certain configurations, for example, a heap leach operation can include surface leaching (such as by drip emitters and/or wobblers) and subsurface and/or deep leaching (such as by injection into the heap, including deep injection of raffinate in a process called "deep-raff injection").

If it is determined that the existing mineralogy is amenable to heap leaching, and other economic conditions are favorable, ore is placed on stockpiles in preparation for leaching. Optimization of ore placement may maximize the profit from a leach operation. Ores that have a high enough copper grade, favorable leach recovery and favorable days under leach (e.g., kinetics) may be crushed and agglomerated prior to conveyor stacking on a leach pad. In these circumstances, the amount of copper that is projected to be recovered via leaching from the ore is more than sufficient to cover the costs of haulage and crushing to a P80 size of less than about 1" (and often with a P80 of <¾" or <½"). The P80 size of an ore size distribution is a measure of particle size distribution having the screen size through which 80% of the particles may pass. The crushed ore may be conveyed into a large, rotating agglomeration drum, where the ore is mixed and wetted with at least one of (or a mixture of) water, reclaimed water, brine, raffinate, Intermediate Leach Solution (ILS), pregnant leach solution (PLS), sulfuric acid, another metal bearing product or products, an auxiliary oxidant, a halide salt, a binder, one or more additives to enhance galvanic leaching or generate heat such as pyrite or a pyrite bearing material, a chelating agent, an organic acid, or other leach additives. One purpose of agglomeration is to attach fine particles to coarser particles so that the particles do not migrate through the stockpile and ultimately cause the permeability of the structure to be decreased. Another purpose of agglomeration is to expose the ore to acid and lixiviants so that the leaching process is started. Yet another purpose of agglomeration is to create ore aggregates with optimum leaching characteristics.

After agglomeration, the ore is fed onto mobile stacking conveyors and deposited in a layer whose thickness (lift height) may be determined by the average leach characteristics of the ore being stacked (usually between 15-30 feet high). If the ore being stacked is a sulfide ore or has a sulfide component that would benefit from oxidation, airflow lines may be installed in the ore (e.g., laid down under the ore that is to be stacked). These airflow lines may be attached to a header which may protrude through the exposed side of the leach pad structure. These headers may be attached to large blowers that blow ambient air into the leach stockpile. Both the volume of air blown into the stockpile and the geometry of the airflow lines influence the efficiency at which air is introduced to the leach process. As the ore is stacked, an earthen structure is formed by the ore such that the top surface of the pad is relatively flat, while the sides (side slopes) of the pad are at the angle of repose of the damp ore.

After an area of the pad has been stacked with ore, an arrangement of leach lines (e.g., drip lines) may be placed on the top surface of the ore. Leach lines may also be placed on the side slopes of the leach pad structure so that the volume of ore around the sides of the pad is included in the leach operation. In other variations, leach lines are configured for subsurface and/or deep injection of leach solution. Leach solution, which may comprise a mixture of raffinate, ILS, PLS, water, sulfuric acid, auxiliary oxidant, and a leach enhancing additive, is pumped through the leach lines, and dripped or sprayed onto the ore and/or injected subsurface or injected deep. For surface leaching, the choice of using drip emitters or sprayers (e.g., wobblers) to introduce leach solution to the ore depends on such factors as the mineralogy of the ore. Sulfide ores have improved recovery when leach solution application rates are low, so drip emitters may be preferred. Sprayers may be used on oxide minerals, whose copper will generally leach by simply exposing the ore to acid. Plant water balance issues also influence the choice. If, due to weather events, too much water has entered the leach system, sprayers can be used to aid in evaporation.

An operational issue that may occur when drip emitters are used is plugging. Wobblers are not as prone to plugging, so wobblers may be used if leach solutions contain suspended solids that are not economical to remove. Because leach pads are very large, it is difficult to know whether leach lines are plugged. Plugged leach lines may be an operational issue because the ore under and adjacent to those leach lines will not be exposed to leach solutions and thus will not produce copper.

In various configurations, a heap leach may be "double piped," that is, two sets of leach lines configured to a permanent heap. In this type of heap leach configuration, one line is dedicated to input of oxidant to the heap and another line is dedicated to input of a mixture of raffinate, sulfuric acid, and citric acid or salts thereof to the heap. This configuration ensures that the mixing of oxidant with the combination of raffinate, sulfuric acid, and citric acid or salts thereof occurs on the rock.

In various embodiments, a double-piped heap leach comprises a trickle-down supply of oxidant, such as for example, <30% purity hydrogen peroxide in one line and raffinate, citric acid or salts thereof, and an amount of sulfuric acid in the second line. The sulfuric acid in the second line can be freshly added, or the sulfuric acid that is recycled back in the raffinate obtained from solvent extraction/electrowinning (SX/EW) or other metal recovery process, so long as the amount of sulfuric acid is about 2 to about 20 pounds/ton of rock.

After the ore has been leached for a chosen number of days (days under leach or the leach cycle), the leach solution flow to the leach pad may be shut off and the pad may be allowed to partially dry out. The copper recovered after this first leach cycle is called first cycle recovery and represents most (about 80%) of the copper that may be recovered from that ore. At this point, the partially leached ore is either removed from the pad or prepared to be stacked over. In some leaching operations, leached ore is removed from the leach pad and restacked into a leached ore residue (i.e., ripios) stockpile in another location. This type of operation is called an "on/off pad" because the ore is put on the pad, leached, and then taken off. Unless the ripios are leached to recover residual copper, ores placed on an on/off pad will only achieve first-cycle recovery. In many leach operations, after ore has completed first cycle leaching, the older ore is left in place and fresh ore is stacked on top of the older ore. Airflow lines may also be installed before the new ore is laid down. In these multiple lift heap leach operations, ore has multiple chances to leach, provided the driving forces for leaching are present in the lower lifts. These driving forces include sufficient acid, so that free acid is present in the lower lifts, sufficient oxidizing potential, usually driven by the presence of ferric iron in solution, and sufficient permeability, so that leach solutions can contact mineral particles.

When ores do not contain enough recoverable copper to make crushing and agglomeration economic, the ore may be dumped by haul trucks onto leach dumps. The particle size distribution of this run-of-mine (ROM) ore is much larger than crushed ore with P80 sizes between 6 and 12 inches. Copper recoveries are lower for ROM ores than crushed-leach ores because the percentage of the ore particles that are available for contact by leach solutions is lower.

Citric Acid and Salts Thereof

In various embodiments, at least an agglomeration solution, leaching solution, or curing solution comprises citric acid or a citrate salt thereof. However, the cost of commercial (technical grade) citric acid is prohibitive for industrial leaching operations.

In various embodiments, citric acid or salts thereof is manufactured near a leaching operation so that it can, in various examples, be added directly from its manufacture to a heap.

In various embodiments, citric acid or salts thereof is obtained by fermentation. Citric acid results from the interaction of the fungus *Aspergillus Niger* with a sugar source such as, for example, corn syrup, beet cuttings, or molasses. These sugar sources may also comprise agricultural waste, such as bagasse. A preferred bagasse comprises sugar cane or sorghum.

In various embodiments, a fermentation process is optimized to produce a broth having a strength of citric acid or salt thereof sufficient for direct use as a leach additive. The resulting citric acid or citrate salt broth may be filtered to remove solids to mitigate plugging of leach equipment and drip lines. The filtered citric acid or citrate broth may then be added to an agglomeration process or to a leaching process as required. If a more concentrated citric acid or citrate broth is required for agglomerating, leaching, or curing, such as in the case where water balance is an issue, the concentration may be raised either by evaporation or by converting the citric acid to calcium citrate by precipitation with calcium carbonate. These processes are described in further detail below and in the context of the drawing figures. While the addition of this processing step adds cost, it could also add process flexibility in terms of optimizing plant water balances. This method of manufacturing citric acid or citrate broth greatly reduces the cost of this reagent and renders it an economically advantageous leach additive.

Cost Considerations

Calculations used to determine the profitability of mining a particular section of ore depend not only on the properties of that ore (e.g., mineralogy, grade, leachability), but also on changing external factors of which leach operators and/or mine operators may have little control. Improved knowledge of expected leach recovery for each block of ore may allow mine operators to further optimize spending to maximize profitability. For example, the cost of blasting the ore in preparation for haulage is significant. This operation uses large drills which are used to create holes in the ore section at specific intervals. Each drill hole is loaded with explosive charges which are detonated to fragment the ore. Ore fragmentation is expensive, but it is one of the most efficient ways of size reduction in mining, as rocks generally have high compressive strength, but are more easily fractured by the tension and shear forces that are present in blasting. Blast fragmentation is an effective way of creating a finer particle size distribution, but the fragmentation comes at the cost of increased drilling and higher usage of explosive agents. This reduced particle size distribution can benefit leach recovery because it exposes a higher percentage of mineral particles, but it also produces more fine particles that could cause permeability problems during leaching. The benefits of blast fragmentation are more obvious for ROM ores which do not undergo further size reduction, but the benefits also translate to crush-for-leach ores because crushing energy is reduced.

Another variable cost is the cost of diesel fuel used by large mining haul trucks, shovels, and other equipment. The price of this commodity causes swings in the costs of mining, and consequently, in the revenue that can be generated from each designated volume of ore. After the ore has been blasted to fragment the ore, the ore is loaded by large mining shovels into diesel fueled haul trucks. The distance between loading and the ultimate destination of a truck load of ore is the haulage distance. The costs of ore haulage are proportional to distance, but also depend on factors such as mine topography and the percentage of the haul that is uphill. Ore haulage costs are a significant mining cost and depend on the cost of tires, tire life, and truck maintenance costs.

One non-limiting way to improve both the cost profile and carbon footprint of a mine is to optimally re-leach ore containing metal values that may not have been recovered earlier due to, for example, the use of older and less optimized leaching techniques. Such "old ore" may have lower contained value metals, such as copper, but it also bears limited costs as it has already been blasted, mined, transported, and stacked. The mineral values left behind in this "old ore" are likely to be largely primary sulfides and thus will require some type of enhanced leach chemistry to recover copper or other metal values in an economically viable way.

In various embodiments, a leaching system herein may include piezometers (or pore pressure meters) that measure the magnitude and distribution of pore pressure and the variation of pore pressure throughout the life of the leach stockpile. The data from an array of piezometers can be used to evaluate flow patterns within the stockpile and the effectiveness of any control measures. In addition to addressing safety concerns with heap stability, data from piezometers could inform the system when leach solutions are channeling within the stockpile and therefore not contacting ore particles uniformly. Piezometers may help to identify the potential for un-leached copper in a specified area so that the un-leached copper could be designated for recovery via methods such as, for example, re-mining or deep raffinate injection.

The cost of sulfuric acid used for leaching is both significant and variable. Leach recovery may be highly dependent on exposing the ore to the optimum amount of acid so that the copper is put into solution and iron precipitation is inhibited. However, over application of acid causes increased acid consumption by gangue minerals (gangue acid consumption), degradation of the ore, and decreased heap permeability. One advantage of the use of citric acid and salts thereof in leaching methods according to the present disclosure is that it inhibits iron precipitation and therefore allows leaching to take place at a higher pH, even under oxidizing conditions which would usually favor iron precipitation.

The acid that is applied to the ore may be introduced as a component of the raffinate flow. Thus, the acid that each particle of ore sees is a function of the acid strength of the raffinate, the flowrate of the raffinate (application rate), the days the ore is under leach, and the physical and mineralogical characteristics of the adjacent ore particles (particularly those particles spatially above the particle in question). For example, if the ore spatially above the particle in question has consumed a significant portion of the free acid that was applied to the ore, there may not be a sufficient driving force for leaching to continue. If the leach driving forces are not present throughout each volume of ore under leach, then the mining, haulage, and placement costs for that volume of ore may be wasted. However, the acid should not be over-applied, or else the acid may be wasted, and permeability concerns occur.

Exemplary Embodiments

In various embodiments of the present disclosure, a method for recovering a metal value from a metal-bearing material comprises the steps of: (i) agglomerating the metal-bearing material with an agglomeration solution comprising a raffinate, an oxidant, and citric acid or salts thereof to produce an agglomerated metal-bearing material; (ii) leaching the agglomerated metal-bearing material with a leaching solution comprising the raffinate and the citric acid or salts thereof to produce a pregnant leaching solution and a leached material; (iii) re-oxidizing the leached material with a curing solution comprising the raffinate and the oxidant; and (iv) recovering the metal value from the pregnant leaching solution to produce the raffinate. In an aspect of this exemplary embodiment, the agglomeration may include resting the metal-bearing material in the agglomeration solution for a duration on the order of at least 2 days. In another aspect of this exemplary embodiment, the leaching may include resting the agglomerated metal-bearing material in the leaching solution for a duration on the order of at least 15 days.

In other exemplary embodiments, a process for recovering a metal value from a metal-bearing material includes the steps of: (i) agglomerating the metal-bearing material with an agglomeration solution comprising a raffinate, an oxidant, and citric acid or salts thereof to produce an agglomerated metal-bearing material; (ii) forming a heap or a portion of a heap with the agglomerated material-bearing material; (iii) leaching the heap with a leaching solution comprising the raffinate and the citric acid or salts thereof to produce a pregnant leaching solution and a leached material; (iv) re-oxidizing the leached material with a curing solution comprising the raffinate and the oxidant; and (v) recovering the metal value from the pregnant leaching solution to produce the raffinate.

In other exemplary embodiments, a process for recovering a metal value from a metal-bearing solution includes the steps of: (i) treating a new or existing Run of Mine (ROM) heap with a trickle down cure comprising a raffinate, an oxidant, and citric acid or salts thereof for a number of days; (ii) allowing the heap to rest; (iii) leaching the heap with a leaching solution comprising the raffinate and the citric acid or salts thereof to produce a pregnant leaching solution and a leached material; (iv) re-oxidizing the leached material with a curing solution comprising the raffinate and the oxidant; and (v) recovering the metal value from the pregnant leaching solution to produce the raffinate.

In exemplary embodiments, metal values include, but are not limited to, copper, nickel, zinc, silver, gold, germanium, lead, arsenic, antimony, chromium, molybdenum, rhenium, tungsten, iron, ruthenium, osmium, cobalt, rhodium, iridium, palladium, platinum, uranium, or rare earth metals. More preferably, the metal values can be copper, nickel, and/or zinc. Most preferably, the metal value is copper.

Figure 1:
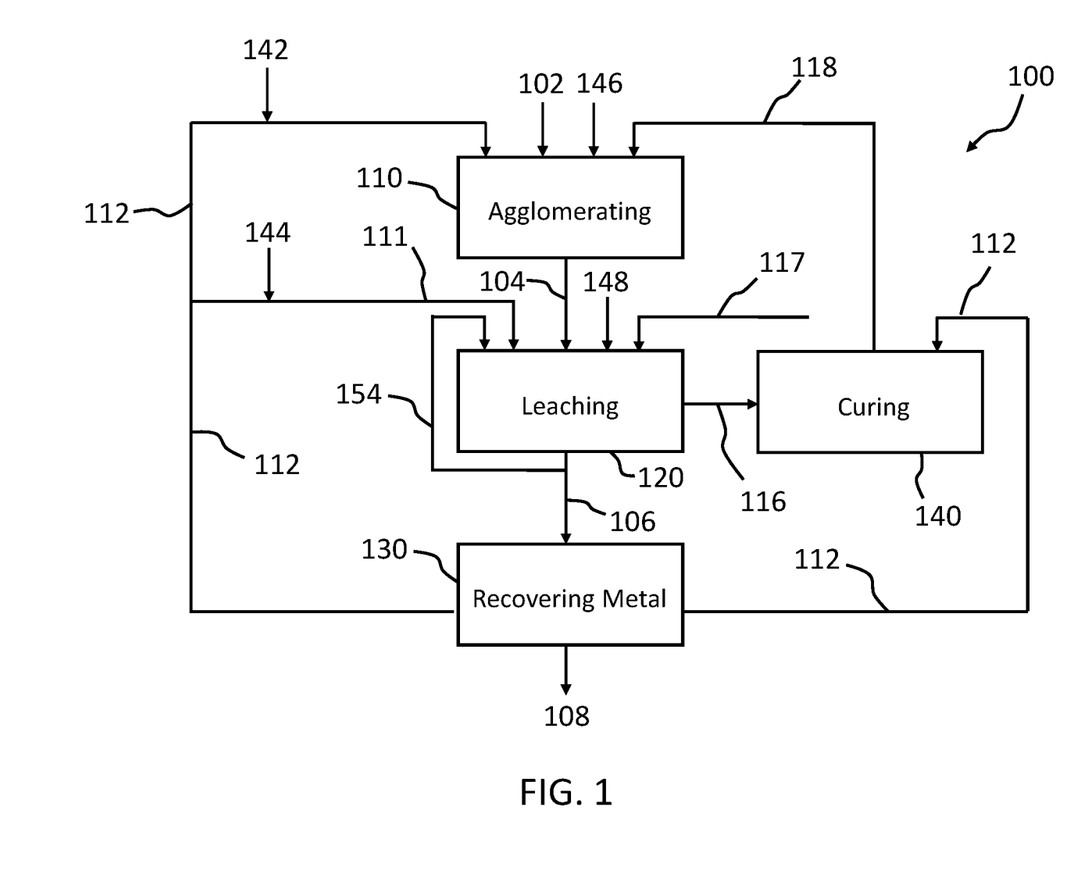
FIG. 1 illustrates various embodiments of methods and systems for recovering metal values from metal-bearing materials in accordance with the present disclosure.

With reference now to FIG. 1, a cyclic process 100 for obtaining a metal value 108 from a metal-bearing material 102 is illustrated, in accordance with various embodiments of the present disclosure. In various embodiments, a metal-bearing material 102 is subjected to method 100 from which copper and/or other metal values 108 may be recovered. The metal-bearing material 102 may be an ore, ROM, a concentrate, a process residue, or any other material from which metal values may be recovered. Further, cured leached material 118 may be added to metal-bearing material or agglomerated metal-bearing material 104 in the heap in the leaching step 120.

Metal values 108, such as those described herein, may be recovered from the metal-bearing material 102. In an aspect of the present invention, the metal-bearing material 102 may comprise a refractory metal sulfide.

In various embodiments, metal-bearing material 102 comprises any one or mixture of chalcocite, pyrite, chalcopyrite, arsenopyrite, bornite, covellite, digenite, cobaltite, enargite, galena, greenockite, millerite, molybdenite, orpiment, pentlandite, pyrrhotite, sphalerite, stibnite, and/or any other suitable metal-bearing ore material or concentrate. In various examples, the metal-bearing material 102 is a primary or secondary sulfide such as chalcocite, bornite, pyrite, or chalcopyrite, or a blend of such mineral species.

In various examples, metal-bearing material 102 comprises a copper sulfide ore, such as, for example, chalcopyrite ($CuFeS_2$), chalcocite ($Cu_2S$), bornite ($Cu_5FeS_4$), covellite (CuS), enargite ($Cu_3AsS_4$), digenite ($Cu_9S_5$), and mixtures thereof.

In various examples, metal-bearing material 102 comprises ore in any number of physical states. Before an ore deposit is mined, the ore is said to be in situ. During mining, the metal-bearing material 102 may progress through multiple states as it is harvested, collected, transported, and processed. For example, the metal-bearing material 102 as harvested at the mining site may often be referred to as run of mine (or "ROM") ore. ROM ore may be produced by, for example, blasting, open pit mining, and other surface and subterranean ore extraction techniques. As such, ROM ore includes ore of various sizes from ore as small as powder up to and including boulders. The metal-bearing material 102 can comprise any of these physical states.

In various embodiments, all, or a portion of, the metal-bearing material 102 is further processed via size classification and/or crushing to achieve a desired particle size distribution, such that substantially all the particles are of a size that allows for effective agglomeration of the metal-bearing material 102 and allows for optimal economic recovery of the contained metal values. The agglomerating process 110 may cure the metal-bearing material 102 to form a cured metal-bearing material.

In various embodiments, the metal-bearing material 102 is characterized by any combination of particle size distributions. For example, the particle distribution may have a combination of fine and coarse particles. Any particle distribution that maximizes agglomeration and/or curing, and metal recovery is useful. The conditions and parameters of the method 100 disclosed herein may be adjusted to achieve an optimized result for leaching and metal recovery.

In various embodiments, the metal-bearing material 102 is subjected to an agglomerating process 110 to produce an agglomerated metal-bearing material 104 that is used in the leach process 120. In alternative embodiments, metal-bearing material, such as crushed ROM can be added directly to the leaching operation (such as through inlet 148 in FIG. 1). In various embodiments, the agglomerating process 110 comprises applying an agglomeration solution to the metal-bearing material 102. In various embodiments, the agglomeration solution comprises a raffinate 112, an oxidant added at 142 and/or present in the raffinate 112 recycled to agglomeration 110, and citric acid or salts thereof added directly at 146 or present in the raffinate 112 recycled to agglomeration 110 for its prior addition at 144.

In various embodiments, the oxidant, such as added at 142, oxidizes a metal component in the metal-bearing material 102 and aids in agglomerating the metal-bearing material 102. In certain embodiments, the oxidant comprises hydrogen peroxide. In various embodiments, the agglomerating process 110 may combine the metal-bearing material 102 with the raffinate 112, the oxidant, and the citric acid or salts thereof (from direct addition at 146 or present in recycled raffinate 112) to form the agglomerated metal-bearing material 104. In various embodiments, the agglomerating process 110 may cure the metal-bearing material 102 in the agglomeration solution to form a cured metal-bearing material. In various embodiments, curing may render the metal-bearing material 102 amenable to a subsequent leaching process 120.

In various embodiments, the raffinate, the oxidant, and the citric acid or salts thereof are mixed prior to combination with the metal-bearing material 102. In an exemplary embodiment, a raffinate provided from an entirely different metal recovery process (outside of FIG. 1) may be piped in to assist in forming agglomerated metal-bearing material 104. In various embodiments, raffinate 112 may be an aqueous product of a solvent extraction process, such as, for example, a conventional solvent extraction/electrowinning (SX/EW) process, or a direct electrowinning (DEW) process. In other words, raffinate 112 may be a product of the metal recovery process 130 that also produces the metal value 108. In various embodiments, the raffinate 112 may comprise water and acid. In various embodiments, the raffinate 112 when recycled may comprise water, sulfuric acid, citric acid, and iron and copper ions because of continual recycling and the option to augment reagents such as citric acid or salts thereof to a recycling raffinate stream in a cyclic process. Therefore, recycling of raffinate to a leaching operation, in accordance with various embodiments of the present disclosure, may mean recycling raffinate, leaching solution or any combination thereof. As such, recycling of leaching solution or raffinate stream may comprise combinations of sulfuric acid, citric acid or salts thereof, and iron and copper ions, optionally augmented with additions of reagents such as citric acid or salts thereof, oxidants, acid, and so forth.

In various embodiments, an agglomeration process 110 comprises combining the metal-bearing material 102, a raffinate, an oxidant, and citric acid or salts thereof in an agglomeration drum. An agglomeration drum may be any suitable agglomeration drum known in the art. In accordance with an exemplary embodiment, the raffinate, the oxidant, and the citric acid or salts thereof may be combined with the metal-bearing material 102 within the agglomeration drum. The quantity of the raffinate, the oxidant, and the citric acid or salts thereof in the agglomeration solution may vary with respect to the type and/or quantity of metal-bearing material 102 used. In this regard, the raffinate may be mixed with a certain quantity of the oxidant and the citric acid or salts thereof to form an agglomeration solution and the agglomeration solution may be optimized during the agglomerating process 110. The metal-bearing material 102 is mixed with the raffinate, the oxidant, and the citric acid or salts thereof in the agglomeration drum to produce the agglomerated metal-bearing material 104. The agglomerating process 110 may include the blending of coarse portions and fine portions of the metal-bearing material 102, such as to maximize metal recovery while maintaining heap permeability in heap leaching.

In various embodiments, an agglomeration solution comprises a certain concentration of an oxidant. In various embodiments, the concentration of the oxidant in the agglomeration solution may be adjusted, such as by direct addition at 146 or mixed with raffinate by addition at 142, to achieve an optimized result for agglomeration and metal recovery. In various embodiments, the minerology of the ore may consume a portion of the oxidant during the agglomeration process 110. In these embodiments, as the actual concentration of the oxidant in the agglomeration solution will be lower than the added concentration, a more highly concentrated addition of the oxidant in the initial agglomeration solution is necessary to obtain the desired actual (i.e., lower) concentration of the oxidant. In various embodiments, the size of the crushed ore may vary. In these embodiments, the finer crushed material will require a lower concentration of the added oxidant while coarser material necessitates the addition of a higher concentration of the oxidant. In various embodiments, the agglomeration solution may comprise a concentration of the oxidant in the range of less than about 10% by weight, 1 to about 6% by weight, or on the order of about 4 to about 6% by weight.

In various embodiments, an agglomeration solution comprises a certain concentration of citric acid or salts thereof. In various embodiments, the concentration of the citric acid or citrate salts in the agglomeration solution may be adjusted, such as by direct addition 146 or entrained into agglomeration from recycled raffinate 112, to achieve an optimized result for agglomeration and metal recovery. In various embodiments, the agglomeration solution may comprise a concentration of citric acid or citrate salts on the order of between 2 grams per liter and 10 grams per liter, or in some examples, about 3 to 5 grams per liter.

In various embodiments, addition of an oxidant at 142 to the raffinate 112 to form an agglomeration solution may produce heat in the agglomeration solution. In various embodiments, the heat generated can increase the temperature of the agglomeration solution by about 10° C. to about 13° C. In various embodiments, agglomerating process 110 may be carried out in an agglomeration solution having a temperature of about 28° C. to about 35° C.

In various embodiments, agglomerating process 110 comprises resting the metal-bearing material 102 in an agglomeration solution for a certain length of time. In various embodiments, the length of time may be adjusted to achieve an optimized result for agglomeration and metal recovery. In various embodiments, the metal-bearing material 102 may rest in an agglomeration solution for any duration of time in the range of about 0 days to about 30 days. In various embodiments, the metal-bearing material 102 may rest in the agglomeration solution for any duration of time in the range of about 1 day to about 10 days. In various embodiments, the metal-bearing material 102 may rest in the agglomeration solution for any duration of time on the order of at least 2 days.

In various embodiments, citric acid or salts thereof, and an oxidant may be added when pyrite is added to agglomerated metal-bearing material or ROM to mitigate iron precipitation.

In various embodiments, agglomerated metal-bearing material 104 obtained from an agglomeration process 110 is then subjected to leaching process 120 to produce a pregnant leaching solution 106 and leached material 116. In various embodiments, a leaching solution used in the leaching process 120 may comprise a raffinate 112 and citric acid or salts thereof added into recycled raffinate at 144 or directly to a leach heap at 148. In various embodiments, the citric acid or salts thereof may act as a chelating agent and have an affinity with the metal value and form a water-soluble metal chelate complex with the metal value to keep the metal value in an aqueous solution. This decreases the thermochemical activity of the metal value and may provide an additional thermodynamic driving force, increasing leaching efficiency. In various embodiments, the addition of the citric acid or salts thereof to the leaching solution stabilizes certain ions in solution, mitigating the precipitation of minerals detrimental to leaching operations. In various embodiments, the leaching solution may comprise water, acid, and iron and copper ions, for example, from recycled raffinate 112.

In various embodiments, a leaching solution for leaching process 120 comprises a concentration of citric acid or salts thereof. In various embodiments, the concentration of citric acid or salts thereof in the leaching solution may be adjusted to achieve an optimized result for leaching and metal recovery. Citric acid or salts thereof may be added into a recycled raffinate 112 at 144 or may be added directly to a leaching process at 148. In various embodiments, the leaching solution may comprise a concentration of citric acid or salts thereof on the order of less than about 20 g/l, preferably in the range of about 0.5 g/l to less than about 10 g/l, more preferably on the order of about 3 g/l.

In various embodiments, a leaching solution for leaching process 120 comprises an oxidant. In various embodiments, the oxidant may be added to other reagents, such as the raffinate 112 and citric acid or salts thereof, to form a leaching solution before the leaching process 120. In various embodiments, the oxidant may be added to a leaching solution such as at 144 or 148 during the leaching process 120. In various embodiments, the oxidant may be added to a leaching solution at various time intervals during the leaching process 120.

In various embodiments, addition of oxidant to other reagents to form a leaching solution before the leaching process 120 generates heat in the leaching solution. In various embodiments, heat generated by adding the oxidant to other reagents to form a leaching solution before the leaching process 120 increases the temperature of the leaching solution by about 10 to about 15° C. In various embodiments, heat generated by adding the oxidant to a leaching solution during the leaching process 120 may also increase the temperature of the leaching solution. In various embodiments, heat generated by adding oxidant to a leaching solution during the leaching process 120 increases the temperature of the leaching solution by about 10 to about 15° C. In various embodiments, the leaching process 120 may be carried out in a leaching solution at a temperature of about 28° C. to about 35° C.

In various embodiments, leaching process 120 comprises applying a leaching solution to an agglomerated metal-bearing material 104 and resting the agglomerated metal-bearing material 104 in the leaching solution for a prescribed period. In various embodiments, the time may be adjusted to achieve an optimized result for leaching and metal recovery. In various embodiments, the agglomerated metal-bearing material 104 may rest in the leaching solution for any duration of time in the range of about 0 to about 50 days. In various embodiments, the agglomerated metal-bearing material 104 may rest in the leaching solution for any duration of time in the range of about 10 to about 45 days. In various embodiments, the agglomerated metal-bearing material 104 may rest in the leaching solution for any duration of time on the order of at least 15 days.

In various embodiments, leaching process 120 comprises heap leaching. Heap leaching comprises stacking or forming agglomerated metal-bearing material 104 and optionally other materials into a heap or a portion of a heap. In various embodiments, heap leaching comprises leaching a heap with leaching solution after the heap is formed. In various embodiments, heap leaching comprises stacking or forming non-agglomerated ROM metal-bearing material into a heap or portion of a heap. In various embodiments, the heap may be treated with a curing solution for a certain period and then subsequently leached with a leaching solution. In various embodiments, the heap may be re-oxidized with a curing solution after leaching and thus rendered amenable to further leaching cycles. In another aspect of the invention, leaching process 120 may comprise any other known leaching method, such as column leaching, shake flask leaching, or tank leaching.

In various embodiments, leaching process 120 comprises heap leaching with two sets of leach lines configured to a permanent heap. In this type of heap leach configuration, one line such as 117 is dedicated to input of oxidant to the heap, such as for trickle-down leaching, and another line such as 111 is dedicated to input to the heap a mixture of raffinate 112, sulfuric acid (from recycled raffinate 112), and citric acid or salts thereof (added at 144, for example, and/or present in recycled raffinate 112).

In various embodiments, re-oxidizing of ferrous ions to ferric ions comprises applying a curing solution to leached material 116 and resting the leached material in the curing solution for a certain period as a curing process 140. In various embodiments, the time may be adjusted to achieve an optimized result for re-oxidizing and metal recovery. In various embodiments the leached material may rest in the curing solution during curing 140 for any duration of time in the range of about 0 to about 30 days. In various embodiments, the leached material 116 may rest in the curing solution for any duration of time in the range of about 1 to about 10 days. In various embodiments, the leached material may rest in the curing solution for any duration of time on the order of at least 2 days.

In various embodiments, a curing solution comprises a concentration of an oxidant. In various embodiments, the concentration of oxidant in a curing solution may be adjusted to achieve an optimized result for re-oxidation and metal recovery. In various embodiments and depending on the mineralogy of the ore being treated, a curing solution may comprise a concentration of oxidant in the range of 8 to 30 percent by weight.

In various embodiments, a curing solution may include a certain concentration of citric acid or salts thereof. In various embodiments, the concentration of citric acid or salts thereof in a curing solution may be adjusted to achieve an optimized result for re-oxidation and metal recovery. In various embodiments, a curing solution may comprise a concentration of citric acid or salts thereof on the order of between 2 and 10 grams per liter.

In various embodiments, a cycle comprising a leaching process and a subsequent re-oxidizing process may be repeated for several or more cycles. The cycling of these processes may be adjusted to achieve an optimized result for metal recovery.

In various embodiments, a pregnant leach solution 106 obtaining from leaching process 120 is subjected to a metal recovery process 130 to produce the desired metal value 108 and raffinate 112. In various embodiments, metal recovery process 130 comprises a direct electrowinning (DEW) process. In another exemplary embodiment, metal recovery process 130 comprises a solvent extraction and electrowinning (SX/EW) process.

In various embodiments, a method 100 of obtaining a metal value from a metal-bearing material comprises a cyclic process.

In various embodiments, raffinate 112 is recycled through suitably configured recirculation lines and reused in a metal leaching method 100. In various embodiments, raffinate 112 may be reused in the agglomerating process 110 as a component of the agglomeration solution. In various embodiments, raffinate 112 may be reused in the leaching process 120 as a component of the leaching solution. In various embodiments of a cyclic process 100, raffinate stream 112 is split at junction 114 to provide raffinate to both agglomeration process 110 and leaching process 120. The junction at 114 may comprise, for example, any type of three-way valve or other suitable controller. In various embodiments, oxidant may be added at 118 to recycled raffinate 112 to form an agglomeration solution useable to agglomerate metal-bearing material 102. In various embodiments, citric acid or salts thereof may be added at 116 to recycled raffinate 112 to form a leaching solution usable to leach agglomerated metal-bearing material 104. In various embodiments, citric acid or salts thereof are provided at input 116 in a stream directed from a fermentation process, as discussed below.

In various embodiments, pregnant leach solution 106 can be recycled directly to the leaching process 120 via the recirculation line 154. This recycling can enhance metal recovery at least in the case of copper ores due to the ferric citrate and copper citrate in solution. The recycling of PLS can be repeated over and over until a desired concentration of metal value is reached in the PLS. Once the desired concentration is achieved, the PLS can be sent to the step of recovering the metal value.

In various embodiments, any portion of metal leaching method 100 may be carried out under a chosen pressure and temperature. In various embodiments, agglomerating process 110, leaching process 120, and metal recovery process 130 may be carried out under a particular pressure and temperature. In various embodiments, the pressure and/or temperature may be adjusted to achieve an optimized result for agglomeration, leaching, and/or metal recovery.

In various embodiments, agglomerating process 110, leaching process 120, and/or metal recovery process 130 may be carried out under atmospheric pressure. In various embodiments, the agglomerating process 110, leaching process 120, and/or metal recovery process 130 may be carried out under another pressure that differs from atmospheric pressure. In various embodiments, agglomerating process 110, leaching process 120, and/or metal recovery process 130 may be carried out under an ambient temperature, such as 20-22° C. In various embodiments, agglomerating process 110, leaching process 120, and/or metal recovery process 130 may be carried out under another temperature, such as 23-60° C.

In instances when the process 100 is configured for copper-bearing material and copper recovery, the oxidant pushes copper sulfides to form copper oxides, disrupting the passivation layer. Citric acid is added to chelate elements such as copper, iron, and calcium to help promote leaching. Holding copper and iron in solution in the form of copper citrate and iron citrate, respectively, enhances copper recovery. Further, keeping calcium in solution helps mitigate plugging of the heap when an aggressive oxidant such as hydrogen peroxide eats away at the rock.

Figure 2A:
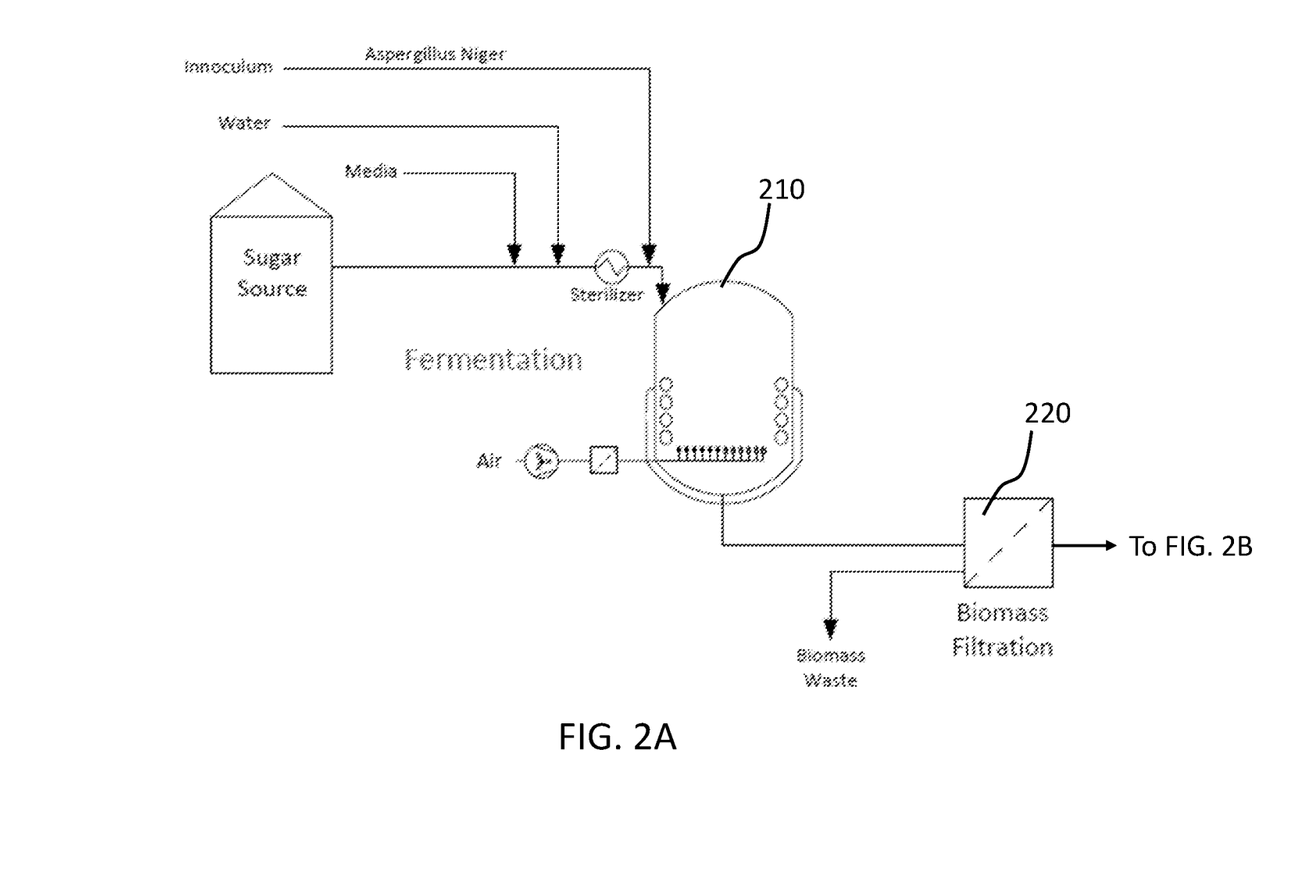
FIGS. 2A and 2B illustrate a fermentation process for producing a minimally purified aqueous citric acid that can be input directly into various methods and systems for recovering metal values from metal-bearing materials.
Figure 2B:
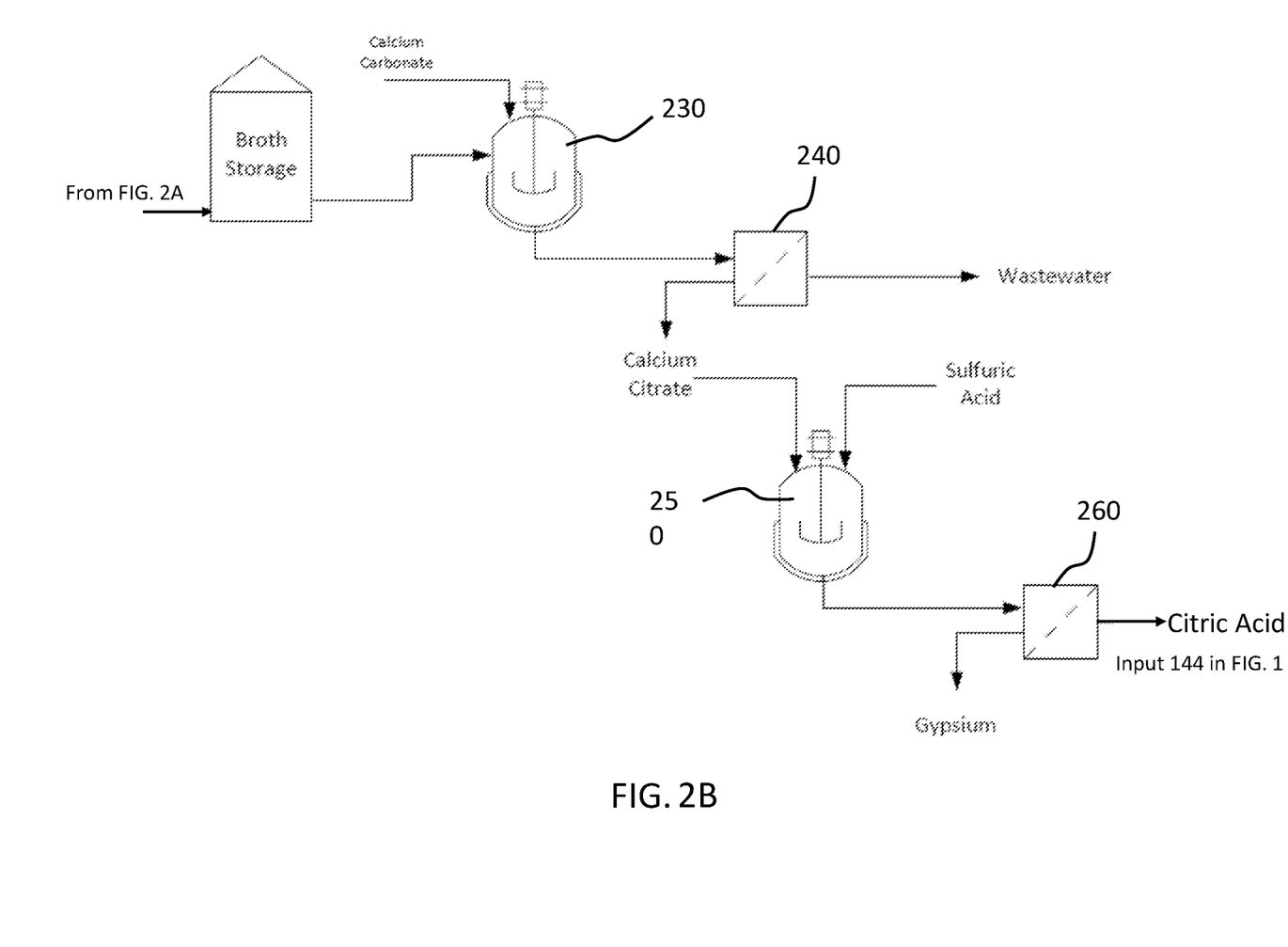

With reference now to FIGS. 2A and 2B, citric acid or salts thereof input 116 in method 100 illustrated in FIG. 1 may be provided by a nearby fermentation process. Ideally, an output stream from a citric acid fermentation process is directed into input 116 of a method 100 according to FIG. 1. FIGS. 2A and 2B outline a fermentation process that begins with a sugar source and microbes and ends with a flow stream comprising aqueous crude citric acid, possibly including some citrate salts depending on the extent of acid treatment at the end of the process.

In various embodiments, and with reference now to FIG. 2A, a fermentation process to produce a source of citric acid begins with addition of water, nutrients, a sugar source, and microbes to a stirred fermentation tank 210. The optional sterilization unit is provided to remove any competing microbes entrained from the sugar source. In various embodiments, the sugar source is waste bagasse, or any type of sugar products such as molasses. The microbes for the fermentation process may comprise various fungi, yeast, or bacteria. In preferred embodiments, the microbe added to the fermentation tank is the fungus, *Aspergillus Niger*. In this process, citric acid is produced by the *Aspergillus Niger* organisms. The fermentation continues until a point when the citric acid thus produced begins to inhibit organism growth. At this point, fermentation is stopped, and the microorganisms are separated from the broth in a biomass separation process 220. The liquid is sent down stream as shown in FIG. 2A for further processing (that continues in FIG. 2B).

With reference now to FIG. 2B, citric acid contained in the broth can be minimally purified before injection into a metal recovery method (such as method 100 depicted in FIG. 1). Citric acid broth may be temporarily stored in a broth storage tank as shown before pumping to a mixing tank 230.

In various embodiments, a rudimentary purification is performed by combining calcium carbonate with the citric acid broth in a mixing tank 230. In this process, the citric acid reacts with the calcium carbonate to form calcium citrate as a precipitate, which can be separated out from a wastewater stream in a separation process 240. In the separation process 240, the calcium citrate may be washed and filtered.

With continued reference to FIG. 2B, the calcium citrate is then added to mixing tank 250 where it is combined with water and sulfuric acid. This forms gypsum (calcium sulfate) and aqueous citric acid. The aqueous citric acid thus produced comprises about 25-30 wt. % citric acid in water. As mentioned, there is no need for further purification, and the aqueous citric acid from the acidification process in mixing tank 250 can be pumped directly to the input 116 in method 100 depicted in FIG. 1.

In various embodiments, the citric acid fermentation process is physically located near the agglomeration and leaching processes described above so that the aqueous citric acid stream obtained from the fermentation process of FIGS. 2A/2B can be directly pumped into a raffinate stream as part of a metal value recovery method 100 depicted in FIG. 1.

Example 1

A specimen of copper-containing ore was subjected to a leaching method in accordance with the present disclosure. The ore used contained, in weight percent based on the total weight of the ore, 0.01% chalcocite, 0.12% chalcopyrite, 0.01% copper-bearing clays, 0.01% copper-bearing biotite, and 0.01% of other types of copper-bearing materials.

In the first step of the process, 25 grams of the ore was added to 15 grams agglomeration solution comprising a raffinate produced from a copper leaching process and the oxidant, hydrogen peroxide. The oxidant is optional in the agglomeration step and may be omitted from the agglomeration solution, such as to show its effect on agglomeration. The concentration of the oxidant in the agglomeration solution was either 0% or 1% in this example.

Next, the ore was allowed to rest in the agglomeration solution for 23 hours, at a chosen temperature described below, and under atmospheric pressure, to produce an agglomerated ore.

Following agglomeration, the agglomerated ore was leached in a 250 mL shake flask for 24 hours under atmospheric pressure at 20-22° C. to produce a pregnant leach solution. The leaching solution used contains the same raffinate as per agglomeration, along with citric acid or a corresponding citrate salt thereof. The citric acid or citrate salt may be omitted from the leaching solution in certain leaching operations to show its leaching effect. The concentration of the citric acid in the leaching solution was either 5 g/l or 10 g/l. The pregnant leach solution was separated from the ore by a filtration process and assayed to determine extracted metal concentration. The filtered ore was then washed, and the wash water was also assayed.

The following four groups of leaching operations were carried out, as listed in Table 1. Except those conditions and reagents described below and listed in Table 1, the four groups of leaching operations were conducted under the same conditions with the same reagents:

Group 1 is a leaching method without using an oxidant in the agglomeration solution or citric acid or any citrate salt in the leaching solution. Group 1 was carried out at 20-22° C. to show the agglomeration effect of the oxidant, and the leaching effect of the citric acid or citrate salt.

Group 2 featured a 1% concentration of oxidant in the agglomeration solution, but no citric acid or salt thereof in the leaching solution. Group 2 was carried out at to show the leaching effect of the citric acid and its agglomeration process was conducted at 20-22° C.

Group 3 featured a 10 g/l concentration of citric acid in the leaching solution but no oxidant in the agglomeration solution. Group 3 was carried out to show the agglomeration effect of the oxidant and its agglomeration process was conducted at 20-22° C.

Group 4 featured a 1% concentration of the oxidant in the agglomeration solution and a 10 g/l concentration of the variant of citric acid in the leaching solution. Group 4 was carried out to show both the agglomeration effect of the oxidant and leaching effect of citric acid and its agglomeration process was at 20-22° C.

As set forth in Table 1, the leaching results showed that a combination of oxidant and citric acid significantly enhanced the copper recovery. The leaching method in Group 4, which featured both an oxidant and citric acid or citrate salt thereof, resulted in a copper recovery of 49.27% compared with 6.36% of copper recovery from the leaching method in Group 1, where there was neither an oxidant nor citric acid or any citrate salt.

TABLE 1

Conditions and Copper (Cu) Recovery for Various Leaching Methods

| Group No. | $H_2O_2$ (%) | Citric Acid (g/l) | Cu Recovery (%) |
|---|---|---|---|
| 1 | 0 | 0 | 6.4 |
| 2 | 1 | 0 | 38.3 |
| 3 | 0 | 10 | 5.9 |
| 4 | 1 | 10 | 49.3 |

Example 2

In this example of another leaching method in accordance with the present disclosure, calcium citrate was used in place of citric acid to demonstrate that citrate salts may be used in place of citric acid. Use of calcium citrate shows that the precipitated citric acid intermediate product also has a beneficial impact on leaching when combined with an oxidant.

Example 2 used the same type of copper-containing ore as per Example 1. The experimental conditions, methodology, and tested reagents were identical to those in Example 1 apart from the oxidant concentration in the agglomeration solution, and the replacement of citric acid with a citrate salt and its concentration in the leaching solution, as described below.

The agglomeration solution contained a raffinate produced from a copper leaching process and hydrogen peroxide. The concentration of hydrogen peroxide in the agglomeration solution was 8%. The ore rested in the agglomeration solution for 23 hours under atmospheric pressure to produce an agglomerated ore.

The agglomerated ore was then leached in a 250 mL shake flask for 24 hours under atmospheric pressure to produce a pregnant leach solution. The leaching solution used comprised the same raffinate, along with citric acid added as calcium citrate. The concentration of calcium citrate in the leaching solution was 5 g/l. The pregnant leach solution was separated from the ore by a filtration process and assayed to determine extracted metal concentration. The filtered ore was then washed, and the wash water was also assayed.

The following four groups of leaching operations were carried out, as listed in Table 2. All groups used a hydrogen peroxide concentration of 8% in the agglomeration solution and, except those conditions and reagents listed in Table 2, the four groups of leaching operations were conducted under the same conditions with the same reagents.

Group 1 is a control, where neither calcium citrate nor hydrogen peroxide are used.

Group 2 featured 5 g/l concentration of calcium citrate, but no oxidant.

Group 3 featured 8% concentration of hydrogen peroxide for agglomeration, but no calcium citrate.

Group 4 featured both calcium citrate and oxidant.

The remarkably higher Cu recovery obtained from the Group 4 test shows an unexpected synergy between calcium citrate and hydrogen peroxide.

TABLE 2

Conditions and Copper (Cu) Recovery for Various Leaching Methods

| Group No. | $H_2O_2$ (%) | Calcium Citrate (g/l) | Cu Recovery (%) |
|---|---|---|---|
| 1 | 0 | 0 | 6.1 |
| 2 | 5 | 0 | 6.2 |
| 3 | 0 | 8 | 40.9 |
| 4 | 5 | 8 | 53.6 |

Example 3

In Example 3, the impact of sequential leaching was studied to determine whether sequential exposure to the citric acid or salt thereof and oxidant combination would continue to leach copper.

A sample of ore containing 0.27 wt. % total copper was tested. The mineralogy of the sample showed it to be 0.24 wt. % chalcopyrite. In this test, a sample of the ore was ground to an average size of 140 mesh. The ore was allowed to rest in raffinate and/or hydrogen peroxide and/or calcium citrate for 23 hours at ambient temperature and atmospheric pressure to produce an agglomerated ore.

Following agglomeration, the agglomerated ore was leached in a 250 mL shake flask for 24 hours under atmospheric pressure at 20-22° C. to produce a pregnant leach solution. The leaching solution used on the agglomerated ore contained the same raffinate and calcium citrate. The pregnant leach solution was separated from the ore by a filtration process and assayed to determine extracted metal concentration. The filtered ore was then washed, and the wash water was also assayed. In this experiment, the filtered ore was then subject to agglomeration and leaching in subsequent cycles and it was found that leach recovery continued cycle after cycle. The results of this test are presented in Table 3.

TABLE 3

Conditions and Copper (Cu) Recovery for Various Leaching Methods

| Group No. | $H_2O_2$ (%) | Calcium Citrate (g/l) | Cumulative Cu Recovery (%) |
|---|---|---|---|
| 1 | 5 | 8 | 37.0 |
| 2 | 5 | 8 | 60.9 |
| 3 | 5 | 8 | 75.7 |
| 4 | 5 | 8 | 85.8 |

Example 4

Example 4 investigates if processes according to the present disclosure could be used in run-of-mine (ROM)

operations where there is no crushing or agglomeration of ore. To simulate a ROM leach operation, a leach column was used.

For this test, a sample of leach residue was obtained from a ROM leach pad that had been subjected to leaching for several years. The remaining copper minerals in this ore either did not leach because they were not liberated and could not contact the lixiviant, or because they are refractory in nature. The ore was crushed to a P100 size of <2 inches and loaded into columns 8 inches in diameter and 5 feet in height. The application rate of the leaching solution was scaled so that each column represents 50 feet of ore in a real-world setting. The ore was exposed to a "trickle down cure" in which raffinate enriched with hydrogen peroxide, sulfuric acid and citric acid was fed to the column for several days. At the end of this cure cycle, a regular leach cycle was initiated. This cycle was repeated several times. As part of this test, "stacked" columns were also run. A stacked column is designed to simulate the impact of leach solutions deeper in the leach pad. In this test, each first column was exposed to a trickle-down cure consisting of raffinate enhanced with hydrogen peroxide, sulfuric acid, and citric acid. Each second column was only fed with the pregnant leach solution (PLS) from the first column and not enhanced with any added reagents.

Surprisingly, the second columns—those columns simulating ore deeper in the leach pad—have a higher recovery than the first columns directly exposed to the reagent combination.

In addition to columns simulating ROM leach recovery with trickle down cures, a duplicate set of columns were run on identical splits of ore, each crushed to a P80 of <½ inch. These samples were agglomerated with raffinate enhanced with hydrogen peroxide, sulfuric acid, and citric acid. The results of the column tests are presented in Table 4.

TABLE 4

Summary of Results from Column Leach Tests

| Column | Ore size | Days under leach | Cu Recovery (%) | PLS Cu (gpl) | Iron Recovery (%) | PLS Fe (gpl) |
|---|---|---|---|---|---|---|
| Baseline (Simulates first 50 feet) | 2" crush | 90 | 11 | 0.8 | −0.2 | 0 |
| ROM (Simulates first 50 feet) | 2" crush | 90 | 13 | 0.5 | 0.9 | 2.0 |
| ROM—stacked (Represents 100 feet) | 2" crush | 90 | 9 | 1.3 | −0.1 | 0.2 |
| Baseline | 2" crush | 30 | 3 | 0.5 | −0.1 | 0 |
| Crushed and agglomerated | P80 ½" crush | 30 | 16 | 1.2 | 1.2 | 2.8 |

In early testing, a cure consisting of only raffinate, and hydrogen peroxide was applied to the column. The column lacked permeability and solution would not flow through the ore. A yellow precipitate believed to be iron jarosite was observed. The application of raffinate enhanced with sulfuric acid and citric acid dissolved the iron precipitate and restored permeability to the column. This is an important finding because many ores consume acid to the extent that the pH of leach solutions, particularly adjacent to particle surfaces, may rise into a pH range favorable for precipitation of iron hydroxides such as jarosite. This is detrimental to leaching for several reasons, including loss of permeability which results in poor contact between minerals and leach solutions, precipitation of gelatinous precipitates which may blind off mineral particles, and loss of ferric iron and its oxidizing potential in leach solutions.

Use of an oxidant alone could aid in chalcopyrite leaching, but the oxidant would also convert iron in solution to ferric iron, which is prone to precipitation as iron hydroxides as pH increases. The addition of citric acid helps to keep ferric iron in solution, preventing precipitation and aiding leach recovery. Table 4 shows that for the Baseline column, leached only with the raffinate from the mine the sample was taken from, iron is lost to precipitation throughout the leach cycle. In the ROM column, to which hydrogen peroxide and citric acid was added and simulating the first 50 feet of a leach stockpile, iron recovery is increased, and iron is present in solution. This iron rich solution, fed to the second stacked column, increases copper recovery copper PLS grade. However, by the end of 100 simulated feet, iron is once again depleted. Such tests could be used in algorithmic leach models to determine optimum dosages of hydrogen peroxide and citric acid according to ore depth. In cases where copper values are located at depths below where active amounts of reagent can penetrate, various sub-surface leaching methods could be employed. Table 4 also shows that crushing and agglomeration benefits both the speed and extent of copper recovery. This latter method could be used if copper values in the ore balanced or paid for the increase in cost for crushing and agglomerating.

In summary, the present disclosure sets forth methods and systems for obtaining metal values from metal bearing materials, the method utilizing an oxidant and citric acid or salts thereof to improve the efficiency of metal extraction operations.

In accordance with the various embodiments of the present disclosure, the described processes increase metal value yield compared with convention methods and systems. Processes herein efficiently enable the chemistry of a leaching operation to be conducted in a portion of a Pourbaix diagram where metal-extraction is thermodynamically feasible. The direct oxidation from the oxidant results in a high solution Eh while the acidic raffinate results in a low solution pH. Other advantages and benefits of the various embodiments of the present processes include little adverse environmental effects. For example, when the oxidant is hydrogen peroxide, it is converted to water during the various processes, while the citric acid or salt thereof is reused throughout the leach cycle with little impact on the environment.

Further advantages and benefits of the various embodiments of the present disclosure include that the citric acid or salts thereof may have an affinity with the metal value and form a water-soluble metal chelate complex with the metal value to keep the metal value in an aqueous solution. This is especially beneficial for the copper sulfide leaching process as the mineralogy of leached ore generally contains gangue, or waste minerals, that consume acid during an ordinary leaching process. This acid consumption causes the pH of the leaching solution to rise. Consequently, iron is precipitated out of the acidic leaching solution to form jarosite. Jarosite is well-known to be detrimental to leaching operations as it coats metal-bearing minerals, decreases the permeability of the leached ore, and depletes leaching solutions of the iron ions necessary to extract the metal value from the ore into solution. When heap air permeability is impacted, the conversion of ferrous ions to ferric ions is diminished and, consequently, the oxidation potential of the leach solutions decreases, lowering the thermodynamic capability of the leaching operation to effectively extract metal values. In accordance with various embodiments of the present invention, it has been found that a chelating agent, such as, for example, citric acid or citrate salts thereof, can stabilize iron in solution and mitigate the formation of jarosite caused by iron precipitation in traditional sulfuric acid leaching processes, thereby increasing metal value recovery and increasing leaching efficiency. This iron stabilization effect has been found to be particularly beneficial when used in combination with an oxidant, such as, for example, hydrogen peroxide. Unexpectedly, the ferric-citrate species formed beneficially participates in leach reactions yielding higher copper recovery.

Steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, coupled or the like may include permanent (e.g., integral), removable, temporary, partial, full, and/or any other possible attachment option. Any of the components may be coupled to each other via friction, snap, sleeves, brackets, clips or other means now known in the art or hereinafter developed. Additionally, any reference to without contact (or similar phrases) may also include reduced contact or minimal contact.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

All structural, chemical, and functional equivalents to the elements of the above-described various embodiments that are known to those of ordinary skill in the art are expressly incorporated herein by reference and are intended to be encompassed by the present claims. Moreover, it is not necessary for an apparatus or component of an apparatus, or method in using an apparatus to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a chemical, chemical composition, process, method, article, or apparatus that comprises a list of elements does not include only those elements but may include other elements not expressly listed or inherent to such chemical, chemical composition, process, method, article, or apparatus.

What is claimed is:

1. A cyclic process comprising:
   leaching a metal-bearing material comprising a metal value with a leaching solution comprising a raffinate, sulfuric acid, an oxidant, and citric acid or salts thereof, to produce a leached material and a pregnant leach solution, the leached material comprising ferrous ($Fe^{2+}$) ions and ferric ($Fe^{3+}$) ions;
   curing the leached material with a curing solution comprising the raffinate and the oxidant to re-oxidize the ferrous ($Fe^{2+}$) ions to ferric ($Fe^{3+}$) ions and to produce a cured leached material;
   recycling the ferric ($Fe^{3+}$) ions to the leaching step; and
   recovering the metal value from the pregnant leach solution to produce the metal value and the raffinate;
   wherein the raffinate obtained after recovering the metal value is recycled to the leaching.

2. The cyclic process of claim 1, wherein the ferric ($Fe^{3+}$) ions are recycled to the leaching in the recycled raffinate.

3. The cyclic process of claim 1, wherein the curing solution further comprises the citric acid or salts thereof.

4. The cyclic process of claim 1, wherein the oxidant comprises hydrogen peroxide.

5. The cyclic process of claim 1, wherein the metal-bearing material comprises run-of-mine (ROM) material optionally augmented with the cured leach material obtained from the curing.

6. The cyclic process of claim 5, wherein the cured leach material comprises the ferric ($Fe^{3+}$) ions recycled to the leaching to augment the ROM material.

7. The cyclic process of claim 1, wherein the leaching and the subsequent curing are cyclically repeated prior to recovering the metal value from the pregnant leach solution.

8. The cyclic process of claim 1, wherein the leaching comprises a heap leach operation, wherein a first line directed to the heap is configured to provide the oxidant to the heap, and a second line directed to the heap is configured to provide the sulfuric acid and the citric acid or salts thereof to the heap.

9. The cyclic process of claim 8, wherein the oxidant comprises hydrogen peroxide.

10. The cyclic process of claim 8, wherein an output from a sugar fermentation process comprising citric acid or salts thereof is directed into the second line directed to the heap to provide the citric acid or salts thereof in the leaching.

11. The cyclic process of claim 1, further comprising a step of agglomerating the metal-bearing material with an agglomerating solution prior to leaching, the agglomerating solution comprising the raffinate, the oxidant, the sulfuric acid, and the citric acid or salts thereof.

12. The cyclic process of claim 11, wherein agglomeration comprises combining the metal-bearing material, the raffinate, the oxidant, and the citric acid or salts thereof in an agglomeration drum.

13. The cyclic process of claim 1, wherein the pregnant leach solution is repeatedly recycled back to the leaching step prior to recovering the metal value from the pregnant leach solution.

14. The cyclic process of claim 1, wherein the metal-bearing material comprises a primary or secondary copper sulfide, or mixtures thereof.

15. The cyclic process of claim 1, wherein recovering the metal value from the pregnant leach solution comprises a solvent extraction/electrowinning (SX/EW) process or a direct electrowinning (DEW) process.

16. The cyclic process of claim 1, wherein the leaching comprises a heap leach operation further comprising subsurface injection of the leaching solution into the heap.

17. The cyclic process of claim 1, wherein the metal-bearing material comprises a mixture of copper-bearing ROM ore and the leached material.

18. The cyclic process of claim 1, wherein leaching further comprises injection of air and/or oxygen into the leaching solution.

19. The cyclic process of claim 1, wherein the leaching comprises a heap leach operation further comprising subsurface injection of air and/or oxygen into the heap.

20. The cyclic process of claim 19, wherein subsurface injection of air and/or oxygen into the heap comprises subsurface injection of the leaching solution aerated with air and/or oxygen.

* * * * *